US010469325B2

(12) United States Patent
Previdi et al.

(10) Patent No.: US 10,469,325 B2
(45) Date of Patent: *Nov. 5, 2019

(54) SEGMENT ROUTING: PCE DRIVEN DYNAMIC SETUP OF FORWARDING ADJACENCIES AND EXPLICIT PATH

(71) Applicant: Cisco Technology, Inc., San Jose, CA (US)

(72) Inventors: Stefano B. Previdi, Rome (IT); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 111 days.

This patent is subject to a terminal disclaimer.

(21) Appl. No.: 15/394,169

(22) Filed: Dec. 29, 2016

(65) Prior Publication Data

US 2017/0111277 A1 Apr. 20, 2017

Related U.S. Application Data

(63) Continuation of application No. 14/211,101, filed on Mar. 14, 2014, now Pat. No. 9,571,349.

(Continued)

(51) Int. Cl.
*H04L 12/24* (2006.01)
*H04L 12/721* (2013.01)
(Continued)

(52) U.S. Cl.
CPC .......... *H04L 41/12* (2013.01); *H04L 12/4633* (2013.01); *H04L 45/04* (2013.01);
(Continued)

(58) Field of Classification Search
None
See application file for complete search history.

(56) References Cited

U.S. PATENT DOCUMENTS

| 5,764,624 | A | 6/1998 | Endo | 370/218 |
|---|---|---|---|---|
| 6,032,197 | A | 2/2000 | Birdwell | 709/216 |

(Continued)

FOREIGN PATENT DOCUMENTS

| CN | 1726 679 A | 1/2006 | H04L 12/56 |
|---|---|---|---|
| CN | 101247 253 A | 8/2008 | H04L 12/18 |

(Continued)

OTHER PUBLICATIONS

Psenak, Peter et al., "Enforcing Strict Shortest Path Forwarding Using Strict Segment Identifiers"; U.S. Appl. No. 15/165,794, filed May 26, 2016; consisting of Specification, Claims, Abstract, and Drawings (52 pages).

(Continued)

*Primary Examiner* — Phirin Sam
*Assistant Examiner* — Sori A Aga
(74) *Attorney, Agent, or Firm* — Campbell Stephenson LLP

(57) ABSTRACT

An apparatus and method for path creation element driven dynamic setup of forwarding adjacencies and explicit path. In one embodiment of the method, a node receives an instruction to create a tunnel between the node and another node. The node creates or initiates the creation of the tunnel in response to receiving the instruction, wherein the tunnel comprises a plurality of nodes in data communication between the node and the other node. The node maps a first identifier (ID) to information relating to the tunnel. The node advertises the first ID to other nodes in a network of nodes.

17 Claims, 8 Drawing Sheets

Related U.S. Application Data

(60) Provisional application No. 61/791,242, filed on Mar. 15, 2013.

(51) Int. Cl.

| | | |
|---|---|---|
| *H04L 12/723* | (2013.01) | |
| *H04L 12/715* | (2013.01) | |
| *H04L 12/741* | (2013.01) | |
| *H04L 12/931* | (2013.01) | |
| *H04L 12/46* | (2006.01) | |
| *H04L 12/913* | (2013.01) | |

(52) U.S. Cl.
CPC ............. *H04L 45/12* (2013.01); *H04L 45/46* (2013.01); *H04L 45/50* (2013.01); *H04L 45/507* (2013.01); *H04L 45/54* (2013.01); *H04L 45/74* (2013.01); *H04L 45/745* (2013.01); *H04L 47/724* (2013.01); *H04L 49/608* (2013.01)

(56) References Cited

U.S. PATENT DOCUMENTS

| | | | |
|---|---|---|---|
| 6,147,976 A | 11/2000 | Shand | |
| 6,374,303 B1 | 4/2002 | Armitage et al. | 709/242 |
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/254 |
| 7,373,401 B1 | 5/2008 | Azad | 370/236.2 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella et al. | 370/248 |
| 7,894,458 B2 | 2/2011 | Jiang | 370/401 |
| 7,940,695 B1 | 5/2011 | Bahadur et al. | 370/254 |
| 7,983,174 B1 | 7/2011 | Monaghan et al. | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang et al. | 370/474 |
| 8,611,335 B1 | 12/2013 | Wu | 370/351 |
| 8,619,817 B1 | 12/2013 | Everson | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,848,728 B1 | 9/2014 | Revah | |
| 8,923,292 B2 * | 12/2014 | Friskney | H04L 12/4645 370/392 |
| 8,953,590 B1 | 2/2015 | Aggarwal | 370/389 |
| 9,036,474 B2 | 5/2015 | Dibirdi et al. | 370/235 |
| 9,049,233 B2 | 6/2015 | Frost et al. | |
| 9,094,337 B2 | 7/2015 | Bragg | |
| 9,112,734 B2 | 8/2015 | Edwards et al. | |
| 9,118,572 B2 | 8/2015 | Sajassi | |
| 9,319,312 B2 | 4/2016 | Filsfils et al. | 709/223 |
| 9,571,349 B2 * | 2/2017 | Previdi | H04L 41/12 |
| 9,660,897 B1 | 5/2017 | Gredler | |
| 9,749,227 B2 | 8/2017 | Frost et al. | |
| 2001/0037401 A1 | 11/2001 | Soumiya | 709/232 |
| 2001/0055311 A1 | 12/2001 | Trachewsky | |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0133412 A1 | 7/2003 | Iyer | 370/235 |
| 2003/0142674 A1 | 7/2003 | Casey | 370/393 |
| 2003/0142685 A1 | 7/2003 | Bare | 370/410 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0190527 A1 | 9/2004 | Okura | |
| 2004/0196840 A1 | 10/2004 | Amrutur et al. | 370/389 |
| 2004/0202158 A1 | 10/2004 | Takeno | 379/389 |
| 2004/0240442 A1 | 12/2004 | Grimminger | 370/389 |
| 2005/0073958 A1 | 4/2005 | Atlas | 370/238 |
| 2005/0105515 A1 | 5/2005 | Reed | |
| 2005/0157724 A1 | 7/2005 | Montuno | |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0056397 A1 | 3/2006 | Aizu | 370/352 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0146696 A1 | 7/2006 | Li | 370/218 |
| 2006/0187817 A1 | 8/2006 | Charzinski | 370/216 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0041345 A1 | 2/2007 | Yarvis | |
| 2007/0053342 A1 | 3/2007 | Sierecki | 370/351 |
| 2007/0058638 A1 | 3/2007 | Guichard et al. | 370/395.31 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0049610 A1 | 2/2008 | Linwong | |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar et al. | 370/392 |
| 2008/0101227 A1 | 5/2008 | Fujita et al. | 370/232 |
| 2008/0101239 A1 | 5/2008 | Goode | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0212465 A1 | 9/2008 | Yan | 370/225 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2008/0316916 A1 | 12/2008 | Tazzari | |
| 2009/0041038 A1 | 2/2009 | Martini et al. | 370/401 |
| 2009/0049194 A1 | 2/2009 | Csaszar | 709/242 |
| 2009/0067445 A1 | 3/2009 | Diguet | 370/419 |
| 2009/0080431 A1 | 3/2009 | Rekhter | 370/392 |
| 2009/0135815 A1 | 5/2009 | Pacella | 370/389 |
| 2009/0196289 A1 | 8/2009 | Shankar | |
| 2009/0247157 A1 | 10/2009 | Yoon | |
| 2009/0296710 A1 | 12/2009 | Agrawal | 370/392 |
| 2010/0063983 A1 | 3/2010 | Groarke et al. | 707/803 |
| 2010/0088717 A1 | 4/2010 | Candelore et al. | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0272110 A1 | 10/2010 | Allan et al. | 370/395.53 |
| 2010/0284309 A1 | 11/2010 | Allan et al. | 370/256 |
| 2011/0021193 A1 | 1/2011 | Hong | |
| 2011/0060844 A1 | 3/2011 | Allan et al. | 709/241 |
| 2011/0063986 A1 | 3/2011 | Denecheau | 370/248 |

(56) References Cited

U.S. PATENT DOCUMENTS

| | | | |
|---|---|---|---|
| 2011/0090913 A1* | 4/2011 | Kim | H04L 45/50 370/400 |
| 2011/0149973 A1 | 6/2011 | Esteve Rothenberg | |
| 2011/0228780 A1 | 9/2011 | Ashwood-Smith | 370/392 |
| 2011/0261722 A1 | 10/2011 | Awano | 370/254 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0063526 A1 | 3/2012 | Xiao | 375/259 |
| 2012/0069740 A1 | 3/2012 | Lu et al. | 370/238 |
| 2012/0069845 A1 | 3/2012 | Carney et al. | 370/392 |
| 2012/0075988 A1 | 3/2012 | Lu | 370/218 |
| 2012/0082034 A1 | 4/2012 | Vasseur | 370/235 |
| 2012/0099861 A1 | 4/2012 | Zheng | |
| 2012/0106560 A1 | 5/2012 | Gumaste | 370/401 |
| 2012/0120808 A1 | 5/2012 | Nandagopal et al. | 370/238 |
| 2012/0170461 A1* | 7/2012 | Long | H04L 45/50 370/235 |
| 2012/0179796 A1 | 7/2012 | Nagaraj | 709/223 |
| 2012/0213225 A1 | 8/2012 | Subramanian et al. | 370/392 |
| 2012/0218884 A1* | 8/2012 | Kini | H04L 45/22 370/228 |
| 2012/0236860 A1 | 9/2012 | Kompella et al. | 370/392 |
| 2012/0243539 A1 | 9/2012 | Keesara | |
| 2012/0287818 A1 | 11/2012 | Corti et al. | |
| 2012/0307629 A1 | 12/2012 | Vasseur | 370/228 |
| 2013/0003728 A1 | 1/2013 | Kwong et al. | 370/389 |
| 2013/0051237 A1 | 2/2013 | Ong | 370/237 |
| 2013/0077476 A1 | 3/2013 | Enyedi | 370/225 |
| 2013/0077624 A1 | 3/2013 | Keesara et al. | |
| 2013/0077625 A1 | 3/2013 | Khera | |
| 2013/0077626 A1 | 3/2013 | Keesara et al. | 370/390 |
| 2013/0114402 A1 | 5/2013 | Ould-Brahim | |
| 2013/0142052 A1 | 6/2013 | Burbidge | 370/242 |
| 2013/0188634 A1 | 7/2013 | Magee | 370/389 |
| 2013/0219034 A1 | 8/2013 | Wang et al. | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0308948 A1 | 11/2013 | Swinkels | |
| 2013/0343204 A1 | 12/2013 | Geib et al. | 370/248 |
| 2014/0044036 A1 | 2/2014 | Kim | |
| 2014/0160925 A1 | 6/2014 | Xu | 370/235 |
| 2014/0169370 A1 | 6/2014 | Filsfils et al. | 370/392 |
| 2014/0177638 A1 | 6/2014 | Bragg et al. | 370/395.3 |
| 2014/0189156 A1 | 7/2014 | Morris | 709/238 |
| 2014/0192677 A1 | 7/2014 | Chew | |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269422 A1 | 9/2014 | Filsfils et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy et al. | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0369356 A1 | 12/2014 | Bryant et al. | 370/392 |
| 2015/0023328 A1 | 1/2015 | Thubert et al. | 370/336 |
| 2015/0030020 A1 | 1/2015 | Kini | 370/389 |
| 2015/0109902 A1 | 4/2015 | Kumar | |
| 2015/0249587 A1 | 9/2015 | Kozat | |
| 2015/0256456 A1 | 9/2015 | Previdi et al. | 370/392 |
| 2015/0263940 A1 | 9/2015 | Kini | 370/236.2 |
| 2015/0326675 A1 | 11/2015 | Kini | 709/224 |
| 2015/0334006 A1 | 11/2015 | Shao | |
| 2015/0381406 A1 | 12/2015 | Francois | 370/218 |
| 2016/0006614 A1 | 1/2016 | Zhao | 370/254 |
| 2016/0021000 A1 | 1/2016 | Previdi et al. | 370/389 |
| 2016/0034209 A1 | 2/2016 | Nanduri | |
| 2016/0034370 A1 | 2/2016 | Nanduri | |
| 2016/0119159 A1 | 4/2016 | Zhao | |
| 2016/0127142 A1 | 5/2016 | Tian | |
| 2016/0173366 A1 | 6/2016 | Saad | |
| 2016/0191372 A1 | 6/2016 | Zhang | 370/390 |
| 2016/0352654 A1 | 8/2016 | Filsfils et al. | 370/392 |
| 2016/0254987 A1 | 9/2016 | Eckert et al. | 370/390 |
| 2016/0254988 A1 | 9/2016 | Eckert et al. | 370/390 |
| 2016/0254991 A1 | 9/2016 | Eckert et al. | 370/225 |
| 2017/0019330 A1 | 1/2017 | Filsfils et al. | 370/389 |
| 2017/0104673 A1 | 4/2017 | Bashandy et al. | 370/392 |
| 2017/0302561 A1 | 10/2017 | Filsfils et al. | 370/389 |
| 2017/0302571 A1 | 10/2017 | Frost et al. | 370/254 |
| 2017/0346718 A1 | 11/2017 | Psenak et al. | 370/235 |
| 2017/0346737 A1 | 11/2017 | Previdi et al. | 370/392 |
| 2017/0366453 A1 | 12/2017 | Previdi et al. | 370/392 |
| 2018/0083871 A1 | 3/2018 | Filsfils | |

FOREIGN PATENT DOCUMENTS

| | | | | |
|---|---|---|---|---|
| CN | 101399 688 A | 4/2009 | | H04L 12/18 |
| CN | 101496 357 A | 7/2009 | | H04L 12/56 |
| CN | 101616 466 A | 12/2009 | | H04W 40/02 |
| CN | 101803 293 A | 8/2010 | | H04L 12/28 |
| CN | 101841 442 A | 9/2010 | | H04L 12/56 |
| CN | 101931 548 A | 12/2010 | | |
| CN | 102098 222 A | 6/2011 | | H04L 12/56 |
| CN | 102132 533 A | 7/2011 | | H04L 12/56 |
| CN | 102299 852 A | 12/2011 | | H04L 12/56 |
| CN | 102498 694 A | 6/2012 | | H04L 12/56 |
| CN | 102714 625 A | 10/2012 | | H04L 12/56 |
| WO | WO 2008/012295 A1 | 2/2008 | | |
| WO | WO2011/032430 | * | 3/2011 | |

OTHER PUBLICATIONS

Nainar, Nagendra Kumar et al., "Reroute Detection in Segment Routing Data Plane"; U.S. Appl. No. 15/266,498, filed Sep. 15, 2016; consisting of Specification, Claims, Abstract, and Drawings (61 pages).

Frost, Daniel C. et al., "MPLS Segment Routing"; U.S. Appl. No. 15/637,744, filed Jun. 29, 2017; consisting of Specification, Claims, Abstract, and Drawings (26 pages).

Filsfils, Clarence et al., "Seamless Segment Routing"; U.S. Appl. No. 15/639,398, filed Jun. 30, 2017; consisting of Specification, Claims, Abstract, and Drawings (31 pages).

Aggarwal, R., et al., Juniper Networks; E. Rosen, Cisco Systems, Inc.; "MPLS Upstream Label Assignment and Context Specific Label Space;" Network Working Group; Internet Draft; Jan. 2005; pp. 1-8.

Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.

Akiya, N. et al., "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.

Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.

Akiya, N. et al., "Seamless Bidirectional Forwarding Detection (BFD) for Segment Routing (SR)"; draft-akiya-bfd-seamless-sr-03; Internet Engineering Task Force; Internet-Draft; Aug. 23, 2014; 7 pages.

Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.

Akiya, N., "Segment Routing Implications on BFD"; Sep. 9, 2013; 3 pages.

Alcatel-Lucent, "Segment Routing and Path Computation Element—Using Traffic Engineering to Optimize Path Placement and Efficiency in IP/MPLS Networks"; Technology White Paper; 2015; 28 pages.

(56) References Cited

OTHER PUBLICATIONS

Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.
Awduche, Daniel O., et al., "RSVP-TE: Extensions to RSVP for LSP Tunnels," Network Working Group, Internet-Draft, Aug. 2000, pp. 1-12.
Awduche, Daniel O., et al., "RSVP-TE: Extensions to RSVP for LSP Tunnels," Network Working Group, Request for Comments 3209, Dec. 2001, pp. 1-61.
Awduche, D. et al., "Requirements for Traffic Engineering Over MPLS"; Network Working Group; Request for Comments: 2702; Sep. 1999; pp. 1-29.
Awduche, D. et al., "Overview and Principles of Internet Traffic Engineering"; Network Working Group; Request for Comments: 3272; May 2002; pp. 1-71.
Backes, P. and Rudiger Geib, "Deutsche Telekom AG's Statement About IPR Related to Draft-Geig-Spring-OAM-Usecase-01," Feb. 5, 2014, pp. 1-2.
Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.
Bryant, S., et al., Cisco Systems, "Remote LFA FRR," draft-ietf-rtgwg-remote-lfa-04, Network Working Group, Internet-Draft, Nov. 22, 2013, pp. 1-24.
Cisco Systems, Inc., "Introduction to Intermediate System-to-Intermediate System Protocol," published 1992-2002; pp. 1-25.
Crabbe, E., et al., "PCEP Extensions for MPLS-TE LSP Protection With Stateful PCE Draft-Crabbe-PCE-Stateful-PCE-Protection-00," Network Working Group, Internet-Draft, Oct. 2012, pp. 1-12.
Crabbe, E., et al., Stateful PCE Extensions for MPLS-TE LSPs, draft-crabbe-pce-stateful-pce-mpls-te-00; Network Working Group, Internet-Draft, Oct. 15, 2012, pp. 1-15.
Deering, S., et al., Cisco, Internet Protocol, Version 6 (IPv6) Specification, Network Working Group, Request for Comments 2460, Dec. 1998, pp. 1-39.
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Farrel, A., et al., Old Dog Consulting, A Path Computation Element (PCE)—Based Architecture, Network Working Group, Request for Comments 4655, Aug. 2006, pp. 1-80.
Farrel, A., et al., Old Dog Consulting, Inter-Domain MPLS and GMPLS Traffic Engineering—Resource Reservation Protocol—Traffic Engineering (RSVP-TE) Extensions, Network Working Group, Request for Comments 5151, Feb. 2008, pp. 1-25.
Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.
Filsfils, C., et al., Cisco Systems, Inc., "Segment Routing Architecture," draft-filsfils-rtgwg-segment-routing-00, Jun. 28, 2013; pp. 1-28.
Filsfils, C., et al., Cisco Systems, Inc., "Segment Routing Architecture"; draft-filsfils-rtgwg-segment-routing-01, Network Working Group, Internet-Draft, Oct. 21, 2013, pp. 1-28.
Filsfils, C. et al., Cisco Systems, Inc., "Segment Routing Interoperability with LDP"; draft-filsfils-spring-segment-routing-ldp-interop-01.txt; Apr. 18, 2014, pp. 1-16.
Filsfils, C. et al., "Segment Routing Architecture"; draft-ietf-spring-segment-routing-07; Network Working Group, Internet-Draft; Dec. 15, 2015; pp. 1-24.
Filsfils, C. et al.; "Segment Routing Use Cases"; draft-filsfils-rtgwg-segment-routing-use-cases-01; Network Working Group; Internet-Draft; Jul. 14, 2013; pp. 1-46.

Filsfils, C. et al., "Segment Routing Use Cases", draft-filsfils-rtgwg-segment-routing-use-cases-02; Network Working Group; Internet-Draft; Oct. 21, 2013; pp. 1-36.
Filsfils, C. et al., "Segment Routing with MPLS Data Plane", draft-ietf-spring-segment-routing-mpls-05; Network Working Group; Internet-Draft; Jul. 6, 2016; 15 pages.
Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.
Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-22.
Frost, D., et al., Cisco Systems, Inc., "MPLS Generic Associated Channel (G-Ach) Advertisement Protocol," Request for Comments 7212, Jun. 2014, pp. 1-23.
Geib, R., "Segment Routing Based OAM Use Case," IETF 87, Berlin, Jul./Aug. 2013, pp. 1-3.
Geib, R., Deutsch Telekom, "Use Case for a Scalable and Topology Aware MPLS data plane monitoring System," draft-geib-spring-oam-usecase-00; Internet-Draft, Oct. 17, 2013, pp. 1-7.
Geib, R., Deutsch Telekom, "Use Case for a Scalable and Topology Aware MPLS Data Plane Monitoring System," draft-geib-spring-oam-usecase-01; Internet-Draft, Feb. 5, 2014, pp. 1-10.
Gredler, H., et al., Juniper Networks, Inc., "Advertising MPLS Labels in IS-IS draft-gredler-isis-label-advertisement-00," Internet-Draft; Apr. 5, 2013; pp. 1-13.
Gredler, H. et al., hannes@juniper.net, IETF87, Berlin, "Advertising MPLS LSPs in the IGP," draft-gredler-ospf-label-advertisement, May 21, 2013; pp. 1-14.
Guilbaud, Nicolas and Ross Cartlidge, "Google~Localizing Packet Loss in a Large Complex Network," Feb. 5, 2013, pp. 1-43.
Imaizumi, H., et al.; Networks, 2005; "FMEHR: An Alternative Approach to Multi-Path Forwarding on Packed Switched Networks," pp. 196-201.
Kompella, K. et al, Juniper Networks, "Label Switched Paths (LSP) Hierarchy with Generalized Multi-Protocol Label Switching (GMPLS) Traffic Engineering (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00; Network Work Group; Internet-Draft; Jan. 2, 2014, pp. 1-15.
Kumar, N. et al, "OAM Requirements for Segment Routing Network"; draft-kumar-spring-sr-oam-requirement-00; Spring; Internet-Draft; Feb. 14, 2014; 6 pages.
Kumar, N. et al, "OAM Requirements for Segment Routing Network"; draft-kumar-spring-sr-oam-requirement-01;Spring; Internet-Draft; Jul. 1, 2014; 6 pages.
Kumar, N. et al, "OAM Requirements for Segment Routing Network"; draft-kumar-spring-sr-oam-requirement-02; Spring; Internet-Draft; Dec. 31, 2014; 6 pages.
Kumar, N. et al, "OAM Requirements for Segment Routing Network"; draft-kumar-spring-sr-oam-requirement-03; Spring; Internet-Draft; Mar. 9, 2015; 6 pages.
Kumar, N. et al., "Label Switched Path (LSP) Ping/Trace for Segment Routing Networks Using MPLS Dataplane", draft-ietf-mpls-spring-lsp-ping-00; Network Work Group; Internet Draft; May 10, 2016; 17 pages.
Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.

(56) References Cited

OTHER PUBLICATIONS

Pignataro, C. et al., "Seamless Bidirectional Forwarding Detection (S-BFD)"; draft-ietf-bfd-seamless-base-11; Internet Engineering Task Force; Internet-Draft; May 6, 2016; 21 pages.

Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.

Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.

Previdi, S. et al., "IS-IS Extensions for Segment Routing"; draft-ietf-isis-segment-routing-extensions-05; IS-IS for IP Internets, Internet-Draft; Jun. 30, 2015; pp. 1-37.

Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.

Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.

Raszuk, R., NTT 13, "MPLS Domain Wide Labels," draft-raszuk-mpls-domain-wide-labels-00, MPLS Working Group, Internet-Draft, Jul. 14, 2013, pp. 1-6.

Rosen, E. et al., Cisco Systems, Inc., "BGP/MPLS VPNs", Network Working Group, Request for Comments: 2547; Mar. 1999, pp. 1-26.

Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.

Li, T., et al., Redback Networks, Inc., "IS-IS Extensions for Traffic Engineering," Network Working Group, Request for Comments 5305, Oct. 2008, 17 pages.

Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.

Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.

Vasseur, JP, et al.; Cisco Systems, Inc. Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.

Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.

Rosen, E. et al., Cisco Systems, Inc., "Multiprotocol Label Switching Architecture", Network Working Group, Request for Comments: 3031; Jan. 2001, pp. 1-61.

* cited by examiner

SEGMENT ROUTING: PCE DRIVEN DYNAMIC SETUP OF FORWARDING ADJACENCIES AND EXPLICIT PATH

RELATED APPLICATIONS

This application is a continuation of U.S. patent application Ser. No. 14/211,101, entitled "Segment Routing: PCE Driven Dynamic Setup of Forwarding Adjacencies and Explicit Path," filed Mar. 14, 2014, which claims the domestic benefit under Title 35 of the United States Code § 119(e) of U.S. Provisional Patent Application Ser. No. 61/791,242, entitled "Segment Routing," filed Mar. 15, 2013, which are hereby incorporated by reference in their entirety and for all purposes as if completely and fully set forth herein.

BACKGROUND

Network nodes forward packets using forwarding tables. Network nodes may take form in one or more routers, one or more bridges, one or more switches, one or more servers, or any other suitable communications processing device. A packet is a formatted unit of data that typically contains control information and payload data. Control information may include: source and destination IP addresses, error detection codes like checksums, sequencing information, etc. Control information is typically found in packet headers and trailers, with payload data in between.

Packet forwarding requires a decision process that, while simple in concept, can be complex. Since packet forwarding decisions are handled by network nodes, the total time required for this can become a major limiting factor in overall network performance.

Multiprotocol Label Switching (MPLS) is one packet forwarding mechanism. MPLS Nodes make packet forwarding decisions based on Label Distribution Protocol (LDP) distributed labels attached to packets and LDP forwarding tables. LDP is a process in which network nodes capable of MPLS exchange LDP labels (hereinafter labels). Packet forwarding based on labels stands in stark contrast to traditional Internet Protocol (IP) routing in which packet forwarding decisions are made by nodes using IP addresses contained within the packet.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

1. Overview

Figure 1:
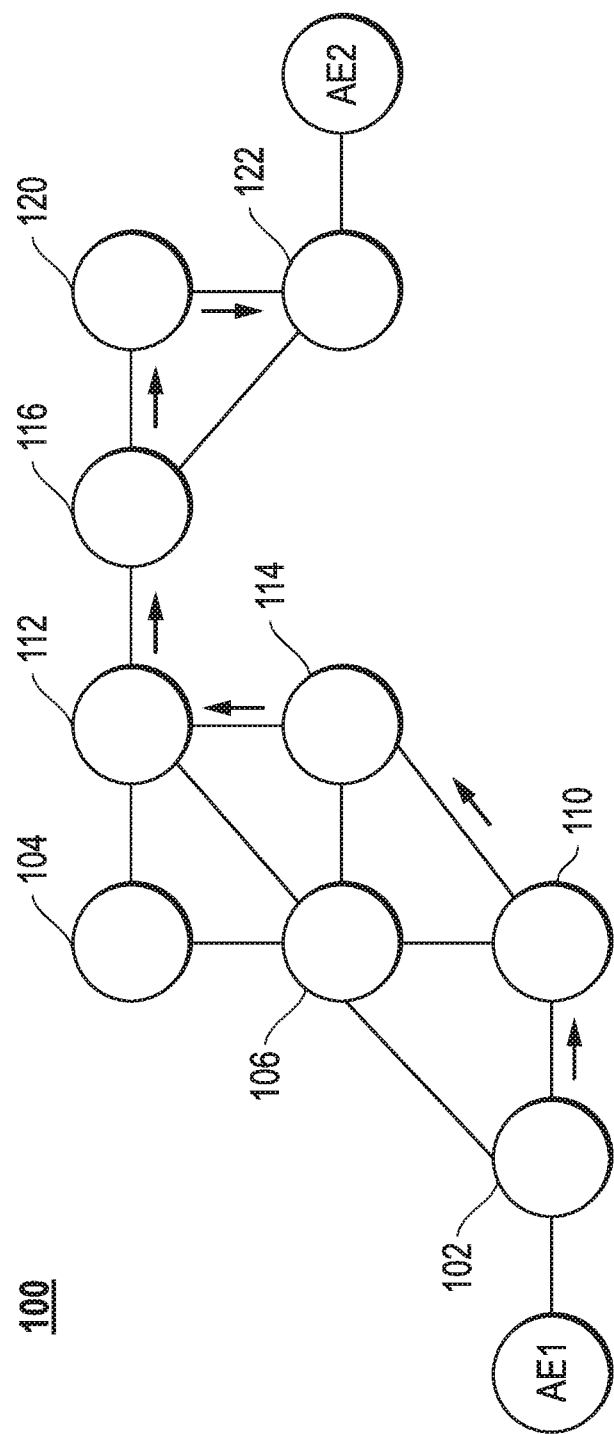
FIG. 1 is a block diagram illustrating certain components of an example network.

An apparatus and method is disclosed for path-creation element driven dynamic setup of forwarding adjacencies and explicit path. In one embodiment of the method, a node receives an instruction to create a tunnel between the node and another node. The node creates or initiates the creation of the tunnel in response to receiving the instruction, wherein the tunnel comprises a plurality of nodes in data communication between the node and the other node. The node maps a first identifier (ID) to information relating to the tunnel. The node advertises the first ID to other nodes in a network of nodes.

2. Packet Forwarding Mechanisms

IP routing and MPLS are distinct packet forwarding mechanisms. IP routing uses IP addresses inside packet headers to make packet forwarding decisions. In contrast, MPLS implements packet forwarding decisions based on short path identifiers called labels attached to packets. Segment routing (SR) is yet another packet forwarding mechanism and can be seen as a modification of MPLS. SR is similar to MPLS in many regards and employs many of the data plane functions thereof. For example, like MPLS packet forwarding decisions in SR can be based on short path identifiers called segment IDs attached to packets. While similarities exist between MPLS and SR, substantial differences exist between SR and traditional MPLS as will be more fully described below.

2.1 IP Packet Routing

IP packet routing uses IP forwarding tables, which are created at nodes using routing information distributed between nodes via one or more protocols like the internal gateway protocol (IGP) and/or the border gateway protocol (BGP). In simple terms, IP forwarding tables map destination addresses to the next hops that packets take to reach their destinations. When a node receives a packet, the node can access a forwarding table using the packet's destination IP address and lookup a corresponding egress interface to the next hop. The node then forwards the packet through the egress interface. The next hop that receives the packet performs its own forwarding table lookup using the same destination IP address in the packet, and so on.

2.2 MPLS and LDP

MPLS is commonly employed in provider networks consisting of interconnected LDP nodes. For the purposes of explanation, LDP nodes take form in MPLS enabled nodes that also implement LDP in the control plane. Packets enter an MPLS network via an ingress edge LDP node, travel hop-by-hop along a label-switched path (LSP) that typically includes one or more core LDP nodes, and exit via an egress edge LDP node.

Packets are forwarded along an LSP based on labels and LDP forwarding tables. Labels allow for the use of very fast and simple forwarding engines in the data planes of nodes. Another benefit of MPLS is the elimination of dependence on a particular Open Systems Interconnection (OSI) model data link layer technology to forward packets.

A label is a short, fixed-length, locally significant identifier that can be associated with a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for such things as network-based virtual private networks, etc. In many ways, LSPs are no different than circuit-switched paths in ATM or Frame Relay networks, except that they are not dependent on a particular Layer 2 technology.

LDP is employed in the control planes of nodes. For purpose of explanation, LDP nodes are those nodes that employ only LDP in their control plane. Two LDP nodes, called LDP peers, can bi-directionally exchange labels on a FEC by FEC basis when setting up an LSP. Some LSPs can be set up using resource reservation protocol (RSVP) tunnel engineering. LDP can be used in a process of building and maintaining LDP forwarding tables that map labels and next hop egress interfaces. These forwarding tables can be used to forward packets through MPLS networks as more fully described below.

When a packet is received by an ingress edge LDP node of an MPLS network, the ingress node may use information in the packet to determine a FEC corresponding to an LSP the packet should take across the network to reach the packet's destination. In one embodiment, the FEC is an identifier of the egress edge node that is closest to the packet's destination IP address. In this embodiment, the FEC may take form in the egress edge node's loopback address.

Characteristics for determining the FEC for a packet can vary, but typically the determination is based on the packet's destination IP address. Quality of Service for the packet or other information may also be used to determine the FEC. Once determined, the ingress edge LDP node can access a table to select a label that is mapped to the FEC. The table may also map a next hop egress interface to the FEC. Before the ingress edge LDP node forwards the packet to the next hop via, the ingress node attaches the label.

When an LDP node receives a packet with an attached label (i.e., the incoming label), the node accesses an LDP forwarding table to read a next hop egress interface and another label (i.e., an outgoing label), both which are mapped to the incoming label. Before the packet is forwarded via the egress interface, the LDP node swaps the incoming label with the outgoing label. The next hop receives the packet with label and may perform the same process. This process is often called hop-by-hop forwarding along a non-explicit path (i.e., the LSP). The penultimate node in the LSP may pop or remove the incoming label before forwarding the packet to an egress edge LDP node in the network, which in turn may forward the packet towards its destination using the packet's destination address and an IP forwarding table. In another embodiment, the last node in the LSP may pop the incoming label before forwarding the packet using the destination address and an IP forwarding table.

To illustrate MPLS aspects, FIG. 1 shows a portion of an example MPLS network 100 that includes LDP nodes 102-122 coupled together via communication links. An LSP from node 102 to node 122 can be created so that all packets of a stream associated with a particular FEC sent from node 102 to node 122 will travel through the same set of nodes. Each LDP node maintains information for the LSP established through it in an LDP forwarding table. Thus, if node 110 knows that node 114 is the next hop along the LSP for all packets received from node 102 that are destined for node 122, node 110 can forward the packets to node 114.

2.3 Segment Routing

Segment routing (SR) is a mechanism in which nodes forward packets using SR forwarding tables and segment IDs. This forwarding mechanism can use the data plane of MPLS with slight modifications as will be more fully described below. As such, the forwarding engines in the data planes of SR nodes are very similar to the forwarding engines in the data planes of SR nodes. Like MPLS, SR enables very fast and simple forwarding engines in the data plane of nodes. SR is not dependent on a particular Open Systems Interconnection (OSI) model data link layer technology to forward packets.

SR nodes (i.e., nodes employing SR but not LDP) make packet forwarding decisions based on segment IDs as opposed to LDP distributed labels, and as a result SR nodes need not employ LDP in their control planes. In one embodiment, segment IDs are substantially shorter than labels. The range for segment IDs may be distinct from the range for labels. Unless otherwise indicated, the SR nodes lack LDP in their control plane.

Packets can enter an SR enabled network via an ingress edge SR node, travel hop-by-hop along a segment path (SP) that includes one or more core SR nodes, and exit the network via an egress edge SR node.

Like labels, segment IDs are short (relative to the length of an IP address or a FEC), fixed-length identifiers. In one embodiment, segment IDs are shorter than labels. Segment IDs may correspond to topological segments of a network, services provided by network nodes, etc. Topological segments represent one hop or multi hop paths to SR nodes. Topological segments act as sub-paths that can be combined to form an SP. Stacks of segment IDs can represent SPs, including sub paths called SR tunnels that are more fully described below. SPs can be associated with FECs as will be more fully described below.

There are several types of segment IDs including nodal-segment IDs, adjacency-segment IDs, forwarding adjacency (FA)-segment IDs, etc. Nodal-segment IDs are assigned to SR nodes so that no two SR nodes belonging to a network domain are assigned the same nodal-segment ID. Nodal-segment IDs can be mapped to unique node identifiers such as node loopback IP addresses (hereinafter loopbacks). In one embodiment, all assigned nodal-segment IDs are selected from a predefined ID range (e.g., [32, 5000]). A nodal-segment ID corresponds to a one-hop or a multi-hop, shortest path (SPT) to an SR node assigned the nodal-segment ID as will be more fully described below.

An adjacency-segment ID represents a direct link between adjacent SR nodes in a network. Links can be uniquely identified. For purposes of explanation only, this disclosure will identify a link using the loopbacks of nodes between which the link is positioned. To illustrate, for a link between two nodes identified by node loopback X and node loopback Y, the link will be identified herein as link XY. Because loopbacks are unique, link IDs are unique. Link IDs should not be confused with adjacency-segment IDs; adjacency-segment IDs may not be unique within a network. This disclosure will presume that only one link exists between nodes in a network, it being understood the present disclosure should not be limited thereto.

Each SR node can assign a distinct adjacency-segment ID for each of the node's links. Adjacency-segment IDs are locally significant; separate SR nodes may assign the same adjacency-segment ID, but the adjacency-segment ID represents distinct links. In one embodiment, adjacency-segment IDs are selected from a predefined range that is outside the predefined range for nodal-segment IDs.

A forwarding adjacency (FA)-segment ID represents an SR tunnel or an MPLS traffic engineering (TE) tunnel between a pair of nodes referred to as the head end and tail end nodes. Head end and/or tail end nodes can create an SR tunnel or a TE tunnel under direction of a path computation (PC) node. The head end and tail end nodes may be SR enabled or both SR and LDP (SR/LDP) enabled as will be more fully described below. Tunnels enable PC nodes to optimize operation of a network.

The SR tunnel constitutes several SR nodes that create a path between the SR head end and tail end nodes. In this regard, the FA-segment ID may correspond to a stack of nodal-segment IDs of the respective SR nodes constituting the path between SR head end and tail end nodes. The FA-segment ID may also correspond to a TE tunnel between SR/LDP head end and tail end nodes. In this latter embodiment, the head end and tail end nodes are both SR and LDP enabled, while the intervening nodes are LDP enabled. All FA-segment IDs are selected from a predefined range of IDs that are outside the ranges for the nodal-segment IDs and adjacency-segment IDs.

SR or SR/LDP nodes can advertise routing information including nodal-segment IDs bound to loopbacks, adjacency-segment IDs mapped to link IDs, FA-segment IDs bound to loopbacks of nodes constituting the SR or TE tunnel, etc., using protocols such as IGP and/or BGP with an appropriate SR extension. Nodes, including path computation (PC) nodes, may use the routing information they receive in order to create topology maps of the network. SR forwarding tables can be created or updated through use of these maps. To illustrate, a node can use the map it creates to identify next hop egress interfaces for shortest paths (SPTs) to respective node loopbacks. The identified SPT or next hop egress interfaces for the loopbacks are then mapped to respective nodal-segment IDs in the forwarding table.

SR nodes can also map their adjacency-segment IDs to egress interfaces for respective links in SR forwarding tables. Because adjacency-segment IDs are locally significant, however, adjacency-segment IDs should only be mapped in SR forwarding tables of the nodes that advertise the adjacency-segment IDs. In other words, an SR node that advertises an adjacency-segment ID should be the only node in the network area that has a SR forwarding table that maps the adjacency-segment ID to an egress interface.

FA-segment IDs are also locally significant. As a result FA-segment IDs should only be mapped in SR nodes or SR/LDP nodes that advertise the FA-segment IDs. FA-segment IDs are not mapped to egress interfaces. Rather, FA-segment IDs can be mapped in SR nodes to stacks of segment IDs, which in turn correspond to SR nodes and/or links constituting respective SR tunnels. Alternatively, the FA-segment IDs can be mapped to labels in SR/LDP nodes, which in turn correspond to respective TE tunnels.

As noted above, SR enables segment paths (SPs), including SR tunnels, through a network. SPs can be associated with FECs. Packets associated with the same FEC normally traverse the same SP to reach their destination. Nodes in SPs make forwarding decisions based on segment IDs, not based on the contents (e.g., destination IP addresses) of packets. As such, packet forwarding in SPs is not dependent on a particular Layer 2 technology.

As noted above, nodes, including PC nodes, can use advertised routing information to create topological maps, and these maps can be used to create SPs including SR tunnels. The nodes can also use advertised routing information such as nodal-segment IDs bound to loopbacks, adjacency-segment IDs mapped to link IDs, FA-segment IDs bound to SR tunnels or TE tunnels, etc., to generate ordered lists of segment IDs (i.e., segment ID stacks) for the paths or tunnels. Individual segment IDs in a stack may correspond to respective segments or sub paths, including SR tunnels or TE tunnels, of a corresponding path.

When an ingress edge SR node receives a packet, the node or a PC node in data communication with the node, can select a segment path (SP) for the packet based on information contained in the packet. In one embodiment, a FEC may be determined for the packet using the packet's destination IP address. Like MPLS, this FEC may take form in an identifier (e.g., loopback) of an egress edge node through which the packet's destination can be reached. The FEC can then be used to select a segment ID stack mapped thereto. The ingress edge node can attach the selected segment ID stack to the packet via a header. The packet with attached segment ID stack is forwarded along and traverses the segments of the SP in an order that corresponds to the list order of the segment IDs in the stack. A forwarding engine operating in the data plane of each SR or SR/LDP node can use the top segment ID within the stack to lookup the egress interface for next hop. As the packet and attached segment ID stack are forwarded along the SP in a hop-by-hop fashion, segment IDs can be popped off the top of the stack. In another embodiment, the attached stack of segment IDs remains unchanged as the packet is forwarded along the SP. In this embodiment, a pointer to an active segment ID in the stack can be advanced as the packet is forwarded along the SP. In contrast to MPLS that uses labels to forward packets, nodal-segment IDs and adjacency-segment IDs are not swapped as the packet and attached segment ID stack are forwarded along the SP. An SR node that advertises an FA-segment ID, however, may swap the FA-segment ID with a stack of segment IDs mapped thereto, or an SR/LDP node that advertises an FA-segment ID may swap the FA-segment ID for a label mapped thereto.

Figure 2:
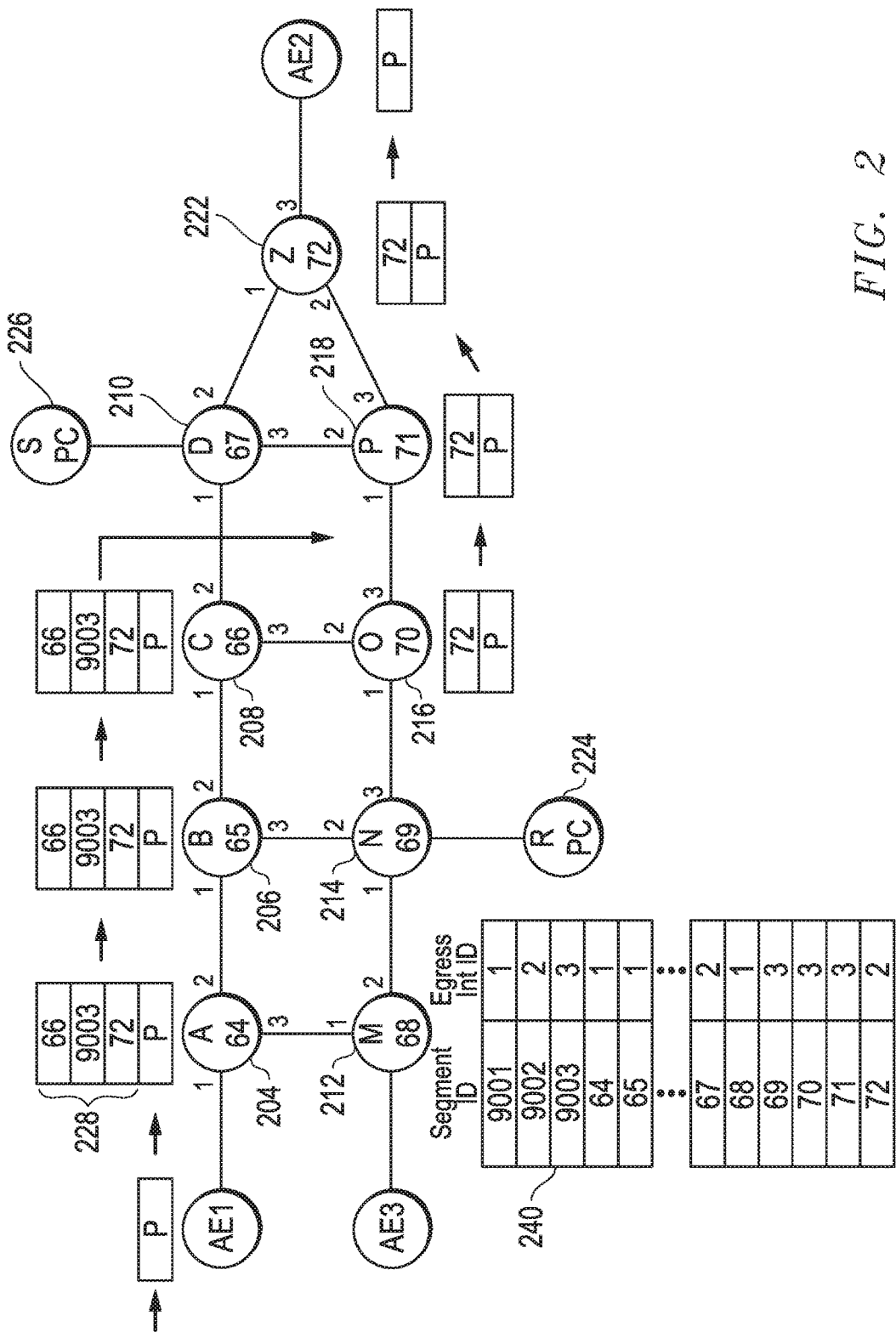
FIG. 2 is a block diagram illustrating certain components of an example network.

To illustrate general concepts of SR, FIG. 2 shows an example SR enabled provider network that is in data communication with nodes AE1-AE3. The network consists of SR nodes 204-222 and PC nodes 224 and 226. Nodes 204-210 are assigned unique nodal-segment IDs 64-67, respectively, nodes 212-218 are assigned unique nodal-segment IDs 68-71, respectively, and node 222 is assigned unique nodal-segment ID of 72. Each of the SR nodes 204-222 have interfaces that are identified as shown. For example, node 204 has three interfaces designated 1-3, respectively. Each of the nodes 204-222 is assigned a unique loopback. Loopbacks A-D are assigned to nodes 204-210, respectively, loopbacks M-P are assigned to nodes 212-218 respectively, loopback R is assigned to PC node 224, loopback S is assigned to node 226, and loopback Z is assigned to node 222. Loopbacks are unique in the network and can be used for several purposes such as calculating the topology of the network, which in turn can be used to create paths or tunnels, to identify SPTs and thus next hop egress interfaces for SR forwarding tables, etc.

One or more nodes 204-222 can also assign locally significant adjacency-segment IDs and FA-segment IDs. For example, node 208 can assign adjacency-segment IDs 9001-9003 to links CB, CD, and CO, respectively. Node 206 can assign FA-segment ID 5500 to an SR tunnel constituting nodes 206, 208, 216, and 218. Nodes 204-222 and PC nodes 224 and 226 collect all information needed for topology creation via IGP and/or BGP. PC nodes 224 and 226 also collect additional information relevant to the state and performance of the network.

Each SR node can advertise routing and performance information to the other nodes in a network, including PC nodes, using IGP and/or BGP with SR extension. For example, node 208 can generate and send one or more advertisements that include adjacency-segment IDs 9001-9003 bound to link IDs CB, CD, and CO, respectively, and nodal-segment ID 66 bound to loopback C. Node 206 may generate an advertisement that includes FA-segment ID 5500 bound to a list of loopbacks B, C, O, and P, which in turn represent the nodes in an SR tunnel or a TE tunnel.

Using the advertisements they receive, the control planes of nodes 204-222 can generate respective SR forwarding tables for use in the data planes. For example, node 208 can generate example SR forwarding table 240 that maps adjacency-segment IDs 9001-9003 to node interface IDs 1-3, respectively, and nodal-segment IDs such as 64, 65, 67, 70, and 72, to node 208 interfaces 1, 1, 2, 3, and 2, respectively, which are the SPT next hop egress interfaces determined by node 208 for loopbacks A, B, D, O, and Z respectively. In the embodiment shown, only SR forwarding table 240 maps adjacency-segment IDs 9001-9003 to interfaces; SR forwarding tables in the other nodes of network 202 should not map adjacency-segment IDs 9001-9003.

In addition to creating SR forwarding tables, SR nodes, SR/LDP or PC nodes 224 and 226 can create segment ID stacks for respective SPs including SR tunnels. For example, ingress edge node 204 or PC node 226 on request can create example segment ID stack 228 for an SP between ingress edge node 204 and egress edge node 222. Example segment stack 228 can be created for a particular FEC (e.g., FEC Z). Example stack 228 includes three segment IDs: nodal-segment IDs 66 and 72 advertised by nodes 208 and 222, respectively, and adjacency-segment ID 9003 advertised by node 208. Stack 228 corresponds to an SP in which packets flow in order through nodes 204, 206, 208, 216, 218, and 222. Node 206 can use loopback/nodal-segment ID bindings to create a tunnel segment ID stack consisting of nodal-segment IDs consisting of 66, 70, and 71. After creation, node 206 maps the tunnel segment ID stack to FA-segment ID 5500. No other node should map this tunnel segment ID stack to FA-segment ID 5500. Tunnel segment ID stack 66, 70, and 71 corresponds to a tunnel in which packets flow in order through nodes 206, 208, 216, and 218.

To illustrate basic SR consider SR node 204 receiving a packet P that is destined for a device that can be reached via AE2, which in turn can be reached via node 222. In response SR node 204 can select a segment ID stack based on information contained in the packet. For example, node 204 can select FEC Z (i.e., the loopback for node 222) for a received packet P based on the destination IP address in packet P and/or other information. FEC Z is mapped to example stack 228 in a table not shown. Node 204 attaches stack 228 to packet P. Example segment stack 228 lists segment IDs that correspond to one hop and multi hop segments that packets traverse to reach egress edge node 222. The one hop and multi hop segments collectively form the SP corresponding to stack 228. Once the segment stack 228 is attached to packet P, ingress SR enable node 204 may access a SR forwarding table (not shown) using the top segment ID (e.g., segment ID=66) of the stack to read egress interface identifier 2, which is the next hop egress interface for the SPT to the SR node assigned nodal-segment ID 66.

Figure 3:
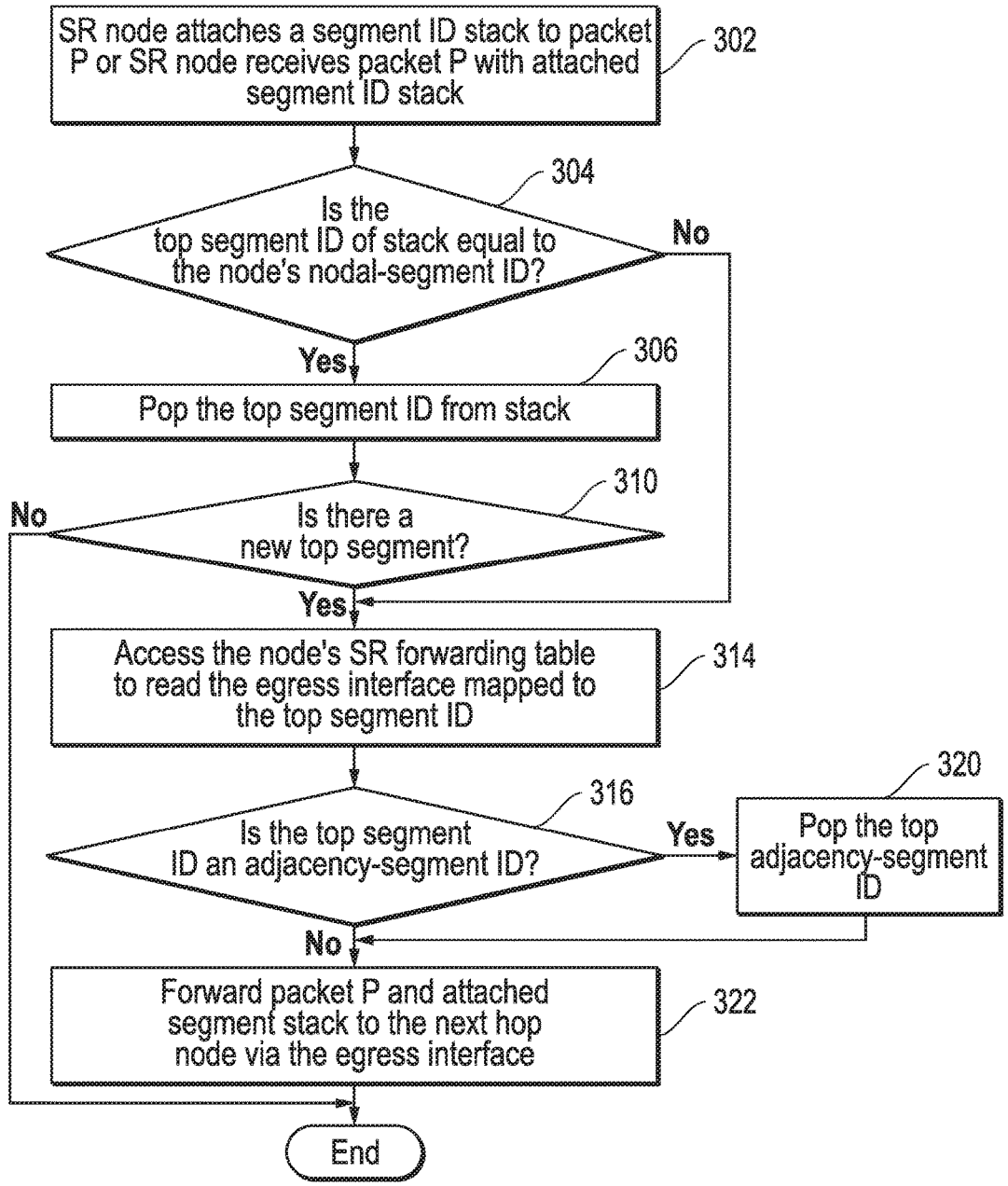
FIG. 3 is a flow chart illustrating an example process employed by a node of FIG. 2.

With continuing reference to FIG. 2, FIG. 3 illustrates an example of a general process of packet forwarding using nodal and adjacency-segment IDs according to one embodiment. More particularly, FIG. 3 illustrates an example method that can be performed by an SR node, including an edge node, in a network like that shown in FIG. 2. In response to receiving a packet with an attached segment ID stack, or in response to attaching a segment ID stack to a packet, the SR node determines in step 304 whether the top segment ID of the stack matches the nodal-segment ID assigned to the SR node. If there is a match, the process proceeds to step 306 where the SR node pops the top segment ID, which may expose an underlying segment ID as the new top segment ID. If there is no new top segment ID (i.e., the segment popped in 306 was the last segment ID of the stack) the packet P has arrived at the egress edge node, and the process ends. If a new top segment ID is exposed, or if there is no match of segment IDs in step 304, the SR node accesses its SR forwarding table in step 314 to read the egress interface that is mapped to the top segment ID. In step 316 the SR node determines whether the top segment ID is an adjacency-segment ID. This determination can be implemented by simply comparing the top segment ID with the designated range of adjacency-segment IDs that are available for assignment within the network. If the top segment ID is found to be within the designated range, the top segment ID is determined to be an adjacency-segment ID and it is popped. In step 322 the SR node forwards packet P and attached stack to the next node via the egress interface identified in step 314.

With continuing reference to FIG. 3, FIG. 2 shows packet P and attached stack 228 as it is forwarded by nodes. As shown, nodes 204 and 206 forward packet P and stack 228 without popping a segment ID. However, node 208 pops nodal-segment ID 66 and adjacency-segment ID 9003 in accordance with steps 306 and 320, respectively, before the packet P and stack 228 are forwarded to node 216 in accordance with step 322. Nodes 216 and 218 forward packet P and stack 228 without popping segment IDs. SR egress edge node 222 recognizes itself as the last hop of the SP. Eventually, node 222 may employ traditional IP routing and forward packet P to access node AE2 based on routing table lookup using the destination IP address within packet P.

3. Segment Routing Using SR Tunnels

SR networks, such as the network shown in FIG. 2, are capable of transporting many different streams of packets over distinct SPs. Often times, many of these SPs share a common sub path through two or more core SR nodes. For example, two or more distinct streams of packets may flow through nodes 206, 208, 216 and 218 in order to reach egress node 222. PC nodes such as PC nodes 224 and 226 may leverage use of common sub paths to enhance network operation. To illustrate, PC node 226 using collected state and performance information, recognizes the sub path consisting of nodes 206, 208, 216, and 218 is commonly used by several packet flows through the network, and as a result PC node 226 can generate and send an instruction to create an SR tunnel from node 206 to node 218 through which packets flow sequentially through nodes 208 and 216. The instruction received by SR node 206 can list the loopbacks (i.e., loopbacks 65, 66, 70, and 71) that constitute the SR tunnel nodes. Node 206 can create a tunnel segment ID stack corresponding to the SR tunnel. For example, SR node 206 can create a tunnel segment ID stack consisting of nodal-segment IDs 66, 70, and 71. Thereafter, node 206 may generate an FA-segment ID 5500 for the tunnel segment ID list, which is then mapped in memory to the tunnel segment ID stack 66, 70, and 71. Eventually node 206 can advertise the FA-segment ID 5500 bound to the loopbacks of the nodes in the tunnel. The advertisement should list the loopbacks by position within the SR tunnel.

Nodes including PC nodes 224 and 226 receive the FA-segment ID advertisements. The nodes can use information from the FA-segment ID advertisements to create SP paths and corresponding segment ID stacks. To illustrate, edge node 212 may lack a segment ID stack for a particular FEC. Node 212 can generate and send to PC node 224 a path request that identifies the egress node it is trying to reach in addition to other information. PC node 224, using the information in the request as well as network state and performance information, responds by calculating a path that flows in order through nodes 214, 206, 208, 216, and 218. In the illustrated example, an SR tunnel preexists through nodes 206, 208, 216 and 218 as advertised by node 206. Node 212 receives the response from PC node 224 and calculates a segment ID stack for the SP. Or PC node 224 can respond to the request by also calculating the segment ID stack for the path. Either way, the segment ID stack includes FA-segment ID 5500, as opposed to a segment ID stack that includes all nodal-segment IDs for the nodes in the needed SP. In an alternative embodiment, PC node 224 can calculate the needed path and the corresponding segment ID stack without involvement of a PC node. When node 212 receives packets associated with the FEC, node 212 can attach the calculated segment ID stack.

Figure 4:
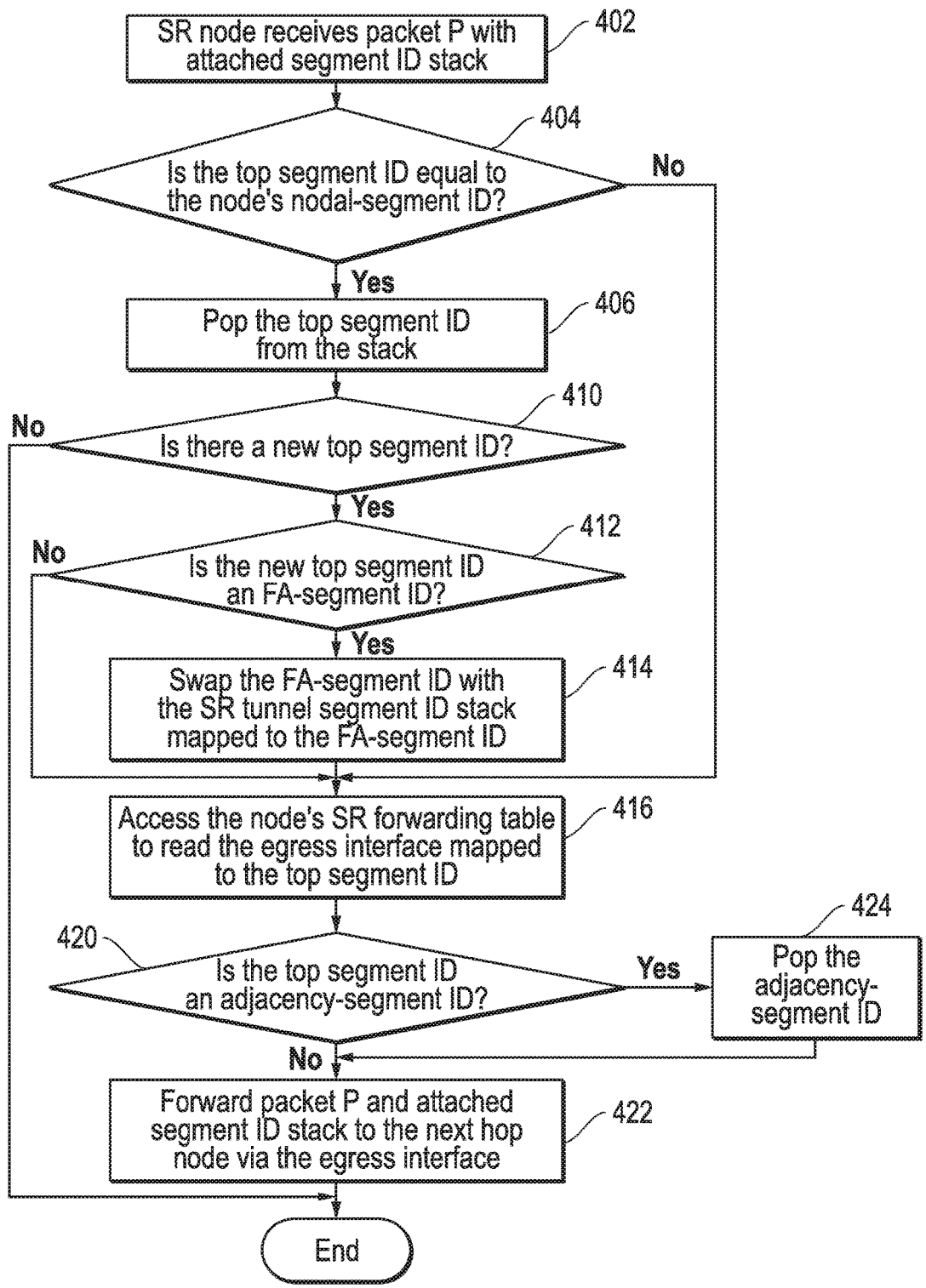
FIG. 4 is a flow chart illustrating an example process employed by a node of FIG. 2.

Nodes within the SP can use the segment IDs, including FA-segment IDs, to forward the packet. FIG. 4 illustrates a process employed by nodes in a network that employs SR tunnels. The process shown in FIG. 4 is substantially similar to the process shown in FIG. 3. A significant difference exists at step 412. In this step, the SR node determines whether the top segment ID is an FA-segment ID. The node can make this determination by comparing the top segment ID with the predefined range for FA-segment IDs. If the top segment ID falls in the range, the top segment ID is determined to be an FA-segment ID. When the new top segment ID is determined to be an FA-segment ID, the node accesses its memory to read the tunnel segment ID stack mapped to the FA-segment ID. Thereafter, the node swaps the top segment ID with the tunnel segment ID stack and the process proceeds to step 416 where the egress interface is identified for the packet and attached segment stack.

Figure 5:
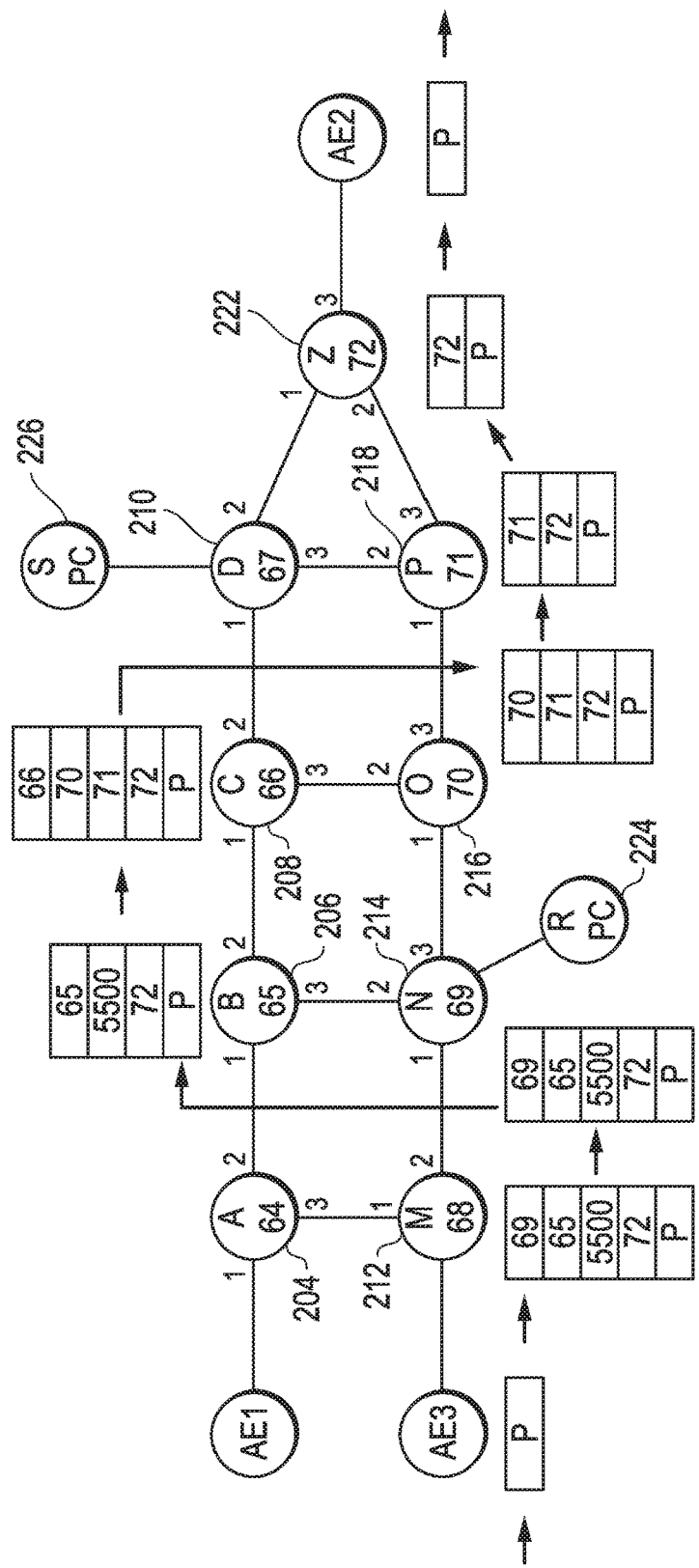
FIG. 5 is a block diagram illustrating certain components of an example network.

FIG. 5 illustrates packet forwarding through the SP that includes the example SR tunnel corresponding to FA-segment ID 5500 in accordance with process shown in FIG. 4. Node 212 attaches the segment ID stack containing FA-segment ID 5500 to packet P. Node 206 receives the packet with attached segment stack from node 214, pops nodal-segment ID 65 in accordance with step 406, and swaps FA-segment ID 5500 with the tunnel segment ID stack consisting of nodal-segment IDs 66, 70, and 71 in accordance with step 414. Node 206 forwards packet P and attached segment stack to node 208 in accordance with step 422.

4. Segment Routing Using TE Tunnels

FIGS. 1, 2, and 5 illustrate example provider networks that contain LDP nodes or SR nodes, but not both. Some providers may employ hybrid networks or networks that contain both LDP and SR nodes. A hybrid network can successfully implement packet transport using TE tunnels extending between SR/LDP head end and tail end nodes. TE tunnels, can be created by head end and tail end SR/LDP nodes in response to receiving a PC node tunnel creation instruction that includes the explicit path definition (i.e., a list of the loopbacks for the nodes constituting the tunnel). Once created, the head end and/or tail end SR/LDP node can associate a FA-segment ID to the TE tunnel.

Figure 6:
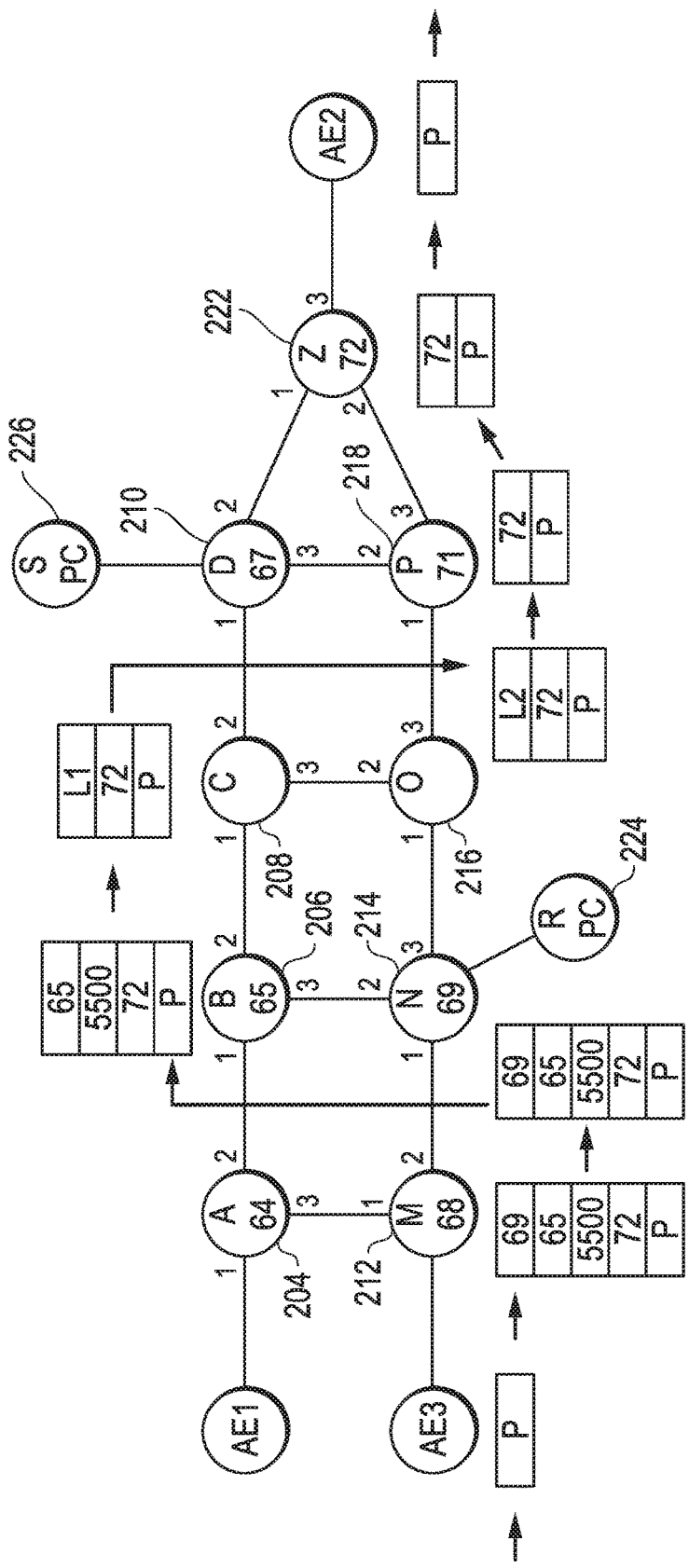
FIG. 6 is a block diagram illustrating certain components of an example network.

FIG. 6 illustrates an example hybrid network that can employ segment routing using TE tunnels. The network is similar to that shown in FIG. 3 and includes SR nodes 204, 210, 212, 214, and 222. Nodes 206 and 218 in this embodiment, however, are both SR and LDP enabled, and nodes 208 and 216 are LDP enabled. The SR/LDP and LDP nodes 206 and 218 can exchange labels using, for example, resource reservation protocol (RSVP) TE signaling during TE tunnel set up.

All SR and SR/LDP nodes are assigned unique nodal-segment IDs. For example, nodes 214, 206, 218, and 222 are assigned nodal-segment IDs 69, 65, 71, and 72, respectively. LDP nodes 208 and 216 are not assigned nodal-segment IDs. Each of the nodes 204-226 is assigned a unique loopback. Loopbacks A-D are assigned to nodes 204-210, respectively, loopbacks M-P are assigned to nodes 212-218 respectively, loopback R is assigned to PC node 224, loopback S is assigned to node 226, and loopback Z is assigned to node 222. These loopbacks are unique in the network and usable to calculate network topology, which in turn can be used to create paths or tunnels, to identify SPTs and next hop egress interfaces for SR forwarding tables, calculate segment ID stacks, etc.

As noted above SR/LDP nodes can create TE tunnels in response to receiving tunnel creation instructions from PC nodes. To illustrate, SR/LDP node 206 may receive an instruction from PC node 226 to create a TE tunnel constituting, in explicit order, nodes 206, 208, 216 and 218. The instruction may define the tunnel in terms of the loopbacks for the nodes constituting the tunnel. Nodes 206, 208, 216 and 218 can employ RSVP-TE messaging to create the tunnel. In this process the nodes may exchange labels. For example, SR/LDP node 206 receives label L1 from LDP node 208, and LDP node 208 receives label L2 from LDP node 216. The labels and egress interfaces are mapped appropriately in LDP forwarding tables. Node 206 generates FA-segment ID 5500 for the example tunnel. Once generated, the head end SR/LDP node 206 can map FA-segment ID 5500 to label L1 in memory. No other node should map label L1 to FA-segment ID 5500. This mapping links label L1 to the TE tunnel in which packets flow in order through nodes 206, 208, 216, and 218.

Each SR and SR/LDP node can advertise routing and performance information to the other nodes in a network, including PC nodes, using IGP and/or BGP with SR extension. For example, node 206 may generate an advertisement that includes FA-segment ID 5500 bound to a list of loopbacks B, C, O, and P for the example TE-tunnel. Edge nodes and/or PC nodes can use the FA-segment ID advertisements to create SPs and corresponding segment ID stacks in much the same manner as described above. For example edge node 212 may lack a segment ID stack for a particular FEC. Node 212 can generate and send to PC node 224 a path request that identifies the egress node for the FEC it is trying to reach in addition to other information. PC node 224, using the information in the request as well as network state and performance information, responds by calculating a path that flows in order through nodes 214, 206, 208, 216, and 218. In the illustrated example, the TE tunnel preexists through nodes 206, 208, 216 and 218 as advertised by node 206, which in turn can be leveraged for more efficient network operation. Node 212 receives the response from PC node 224 and calculates a segment ID stack for the needed SP. Or PC node 224 can respond to the request by also calculating the segment ID stack for the needed SP. Either way, the segment ID stack includes FA-segment ID 5500. In an alternative embodiment, PC node 224 can calculate the needed path and the corresponding segment ID stack without involvement of a PC node. When node 212 receives packets associated with the FEC, node 212 can attach the calculated segment ID stack.

Figure 7:
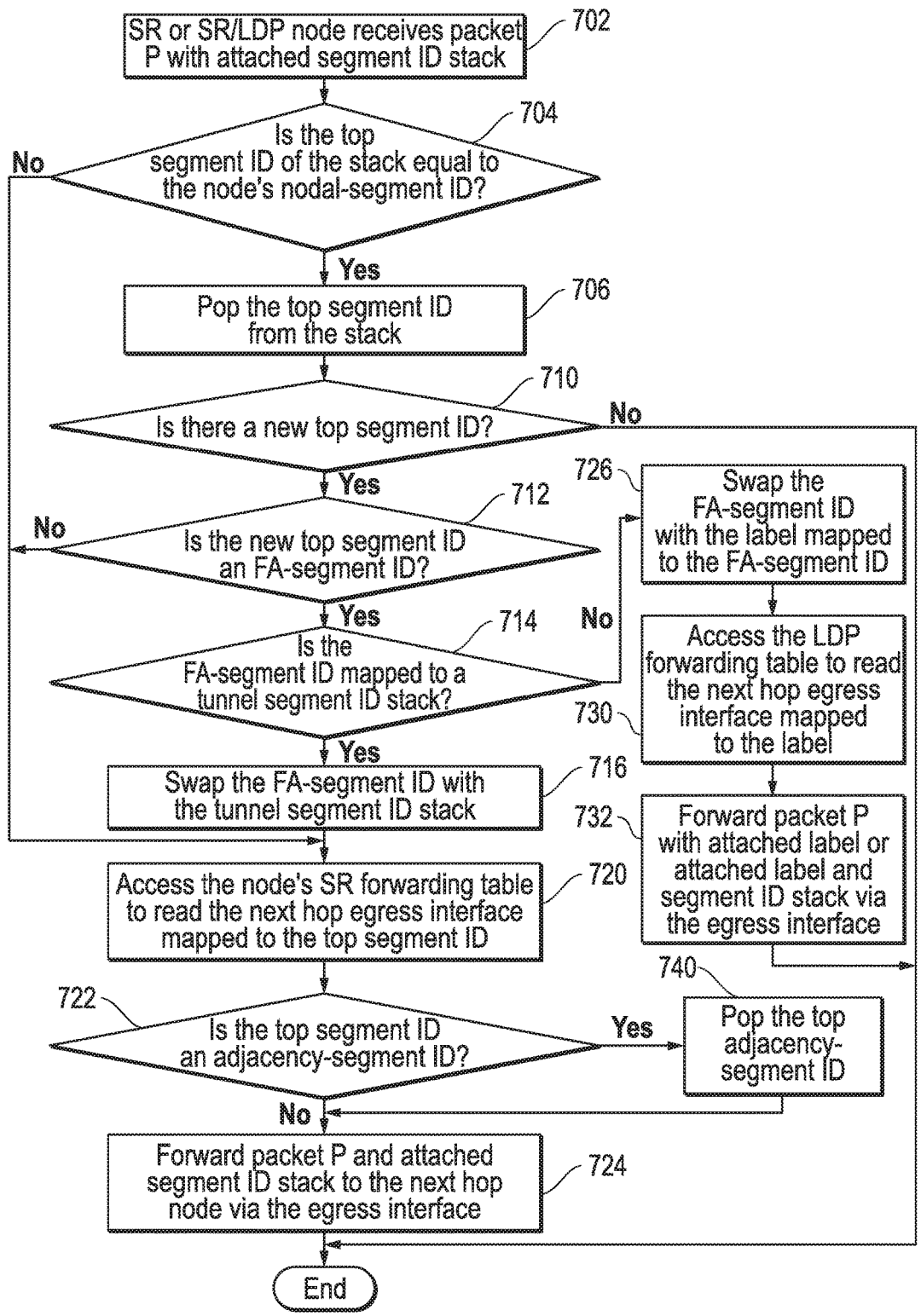
FIG. 7 is a flow chart illustrating an example process employed by a node of FIG. 6.

FIG. 7 illustrates an example forwarding process employed within nodes of a network such as that shown in FIG. 6. The process shown in FIG. 7 is similar to the process shown in FIG. 4. However, significant differences exist. More particularly, as shown in FIG. 7 if the top segment ID is determined to be an FA-segment ID in step 712, the node that receives the packet P determines whether the FA-segment ID is mapped to a tunnel segment ID stack or a label. If it is mapped to a tunnel segment ID stack, the process proceeds to step 716 where the node swaps the FA-segment ID with the SR tunnel segment ID stack mapped to the FA-segment ID. However, if it is determined the FA-segment ID is not mapped to a tunnel segment ID stack, the process proceeds to step 726 where the SR/LDP node swaps the FA-segment ID with the label mapped in memory to the FA-segment ID. Thereafter, the node accesses its LDP forwarding table to read the next hop egress interface mapped to the label. The node then forwards the packet P with the attached label or attached label and segment ID stack via the egress interface identified in step 730. Although not shown in FIG. 7, the tail end SR/LDP node will receive the packet P with a segment list attached to it, and the tail end SR/LDP node will process or forward the packet in accordance with the process shown within FIG. 3 after the penultimate node in the TE tunnel pops the label and forwards the packet to the SR/LDP tail end.

FIG. 6 illustrates packet forwarding through the hybrid network that includes the example TE tunnel corresponding to FA-segment ID 5500 in accordance with process shown in FIG. 7. Node 212 attaches the segment ID stack containing FA-segment ID 5500 to packet P. Node 206 receives the packet with attached segment stack from node 214, pops nodal-segment ID 65 in accordance with step 406, and swaps FA-segment ID 5500 with label L1 in accordance with step 726. Node 206 forwards packet P and attached label and segment stack to node 208 in accordance with step 732.

Figure 8:
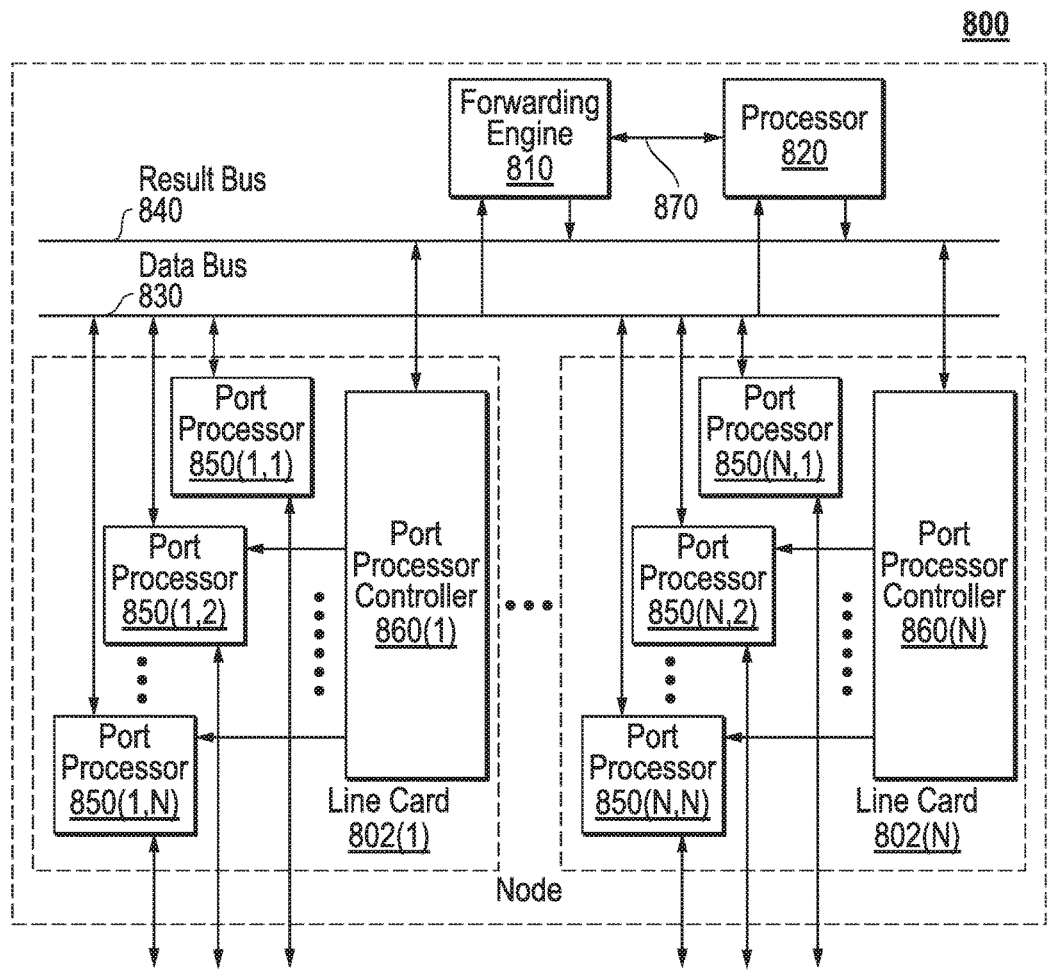
FIG. 8 is a block diagram illustrating certain components of an example node that can be employed in the network of FIG. 1, 2, 5 or 6.

FIG. 8 is a block diagram illustrating certain additional and/or alternative components of nodes that can be employed in the networks shown in FIG. 1, 2, 5, or 6. In this depiction, node 800 includes a number of line cards (line cards 802(1)-(N)) that are communicatively coupled to a forwarding engine or packet forwarder 810 and a processor 820 via a data bus 830 and a result bus 840. Line cards 802(1)-(N) include a number of port processors 850(1,1)-(N,N) which are controlled by port processor controllers 860(1)-(N). It will also be noted that forwarding engine 810 and processor 820 are not only coupled to one another via data bus 830 and result bus 840, but are also communicatively coupled to one another by a communications link 870.

The processors 850 and 860 of each line card 802 may be mounted on a single printed circuit board. When a packet or packet and header are received, the packet or packet and header may be identified and analyzed by router 800 in the following manner. Upon receipt, a packet (or some or all of its control information) or packet and header is sent from the one of port processors 850(1,1)-(N,N) at which the packet or packet and header was received to one or more of those devices coupled to data bus 830 (e.g., others of port processors 650(1,1)-(N,N), forwarding engine 810 and/or processor 820). Handling of the packet or packet and header can be determined, for example, by forwarding engine 810. For example, forwarding engine 810 may determine that the packet or packet and header should be forwarded to one or more of port processors 850(1,1)-(N,N). This can be accomplished by indicating to corresponding one(s) of port processor controllers 860(1)-(N) that the copy of the packet or packet and header held in the given one(s) of port processors 850(1,1)-(N,N) should be forwarded to the appropriate one of port processors 850(1,1)-(N,N). In addition, or alternatively, once a packet or packet and header has been identified for processing, forwarding engine 810, processor 820 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   a node receiving an instruction to create a tunnel in a network between the node and another node via a plurality of nodes in data communication between the node and the other node, wherein the node is segment routing enabled, wherein each of the plurality of nodes are not segment routing enabled, and wherein each of the plurality of nodes is multiprotocol label switching (MPLS) enabled;
   in response to receiving the instruction, the node mapping a first segment identifier (ID) to a label distribution protocol (LDP) label relating to the tunnel;
   the node creating an advertisement that comprises the first segment ID bound to a plurality of node identifiers, wherein the plurality of node identifiers uniquely identify the plurality of nodes, respectively, in the network;
   the node transmitting the advertisement to another node in the network.

2. The method of claim 1 further comprising an act of receiving the LDP label from one of the plurality of nodes.

3. The method of claim 1 wherein the instruction comprises the plurality of node identifiers.

4. The method of claim 3 wherein each of the plurality of node identifiers comprises a loopback address.

5. The method of claim 1 further comprising:
   transmitting a resource reservation protocol (RSVP) tunnel engineering (TE) message to one of the plurality of nodes;
   receiving the LDP label from the one of the plurality of nodes in response to transmitting the RSVP-TE message.

6. The method of claim 1 further comprising;
   the node receiving a packet with the first segment ID attached thereto;
   the node swapping the first segment ID with the LDP label;
   the node forwarding the packet with the LDP label attached thereto.

7. The method of claim 6 wherein the node forwards the packet with the attached LDP label to one of the plurality of nodes.

8. The method of claim 1 wherein the instruction was generated by a third node that is configured to calculate paths through the network of nodes.

9. An apparatus comprising:
a first node, the first node comprising:
a circuit configured to receive an instruction to create a multiprotocol label switching (MPLS) traffic engineering tunnel in a network between the first node and a second node via a plurality of nodes in data communication between the first node and the second node, wherein the first node is segment routing enabled, wherein each of the plurality of nodes are not segment routing enabled, wherein each of the plurality of nodes is MPLS enabled;
a circuit for mapping a forwarding adjacency (FA) segment identifier (ID) to a label distribution protocol (LDP) label relating to the tunnel in response to the first node receiving the instruction;
a circuit for advertising the FA segment ID to other nodes in a network of nodes;
wherein the FA segment ID corresponds the MPLS traffic engineering tunnel.

10. The apparatus of claim 9 wherein the LDP label was received by the first node from one of the plurality of nodes.

11. The apparatus of claim 9 wherein the instruction comprises identifiers for the plurality of nodes, respectively.

12. The apparatus of claim 9 wherein the first node further comprises:
a circuit for transmitting a resource reservation protocol (RSVP) tunnel engineering (TE) message to one of the plurality of nodes;
a circuit for receiving the LDP label from the one of the plurality of nodes.

13. The apparatus of claim 9 wherein the first node further comprises:
a circuit for receiving a packet with the FA segment ID attached thereto;
a circuit for swapping the FA ID with the LDP label;
a circuit for forwarding the packet with the LDP label attached thereto.

14. An apparatus comprising:
a node comprising one or more processors for executing instructions, and one or more memories for storing instructions executable by the one or more processors, wherein the one or more processors implement a method in response to executing the instructions, the method comprising;
receiving an instruction to create a tunnel in a network between the node and another node via a plurality of nodes in data communication between the node and the other node wherein the node is segment routing enabled, wherein each of the plurality of nodes are not segment routing enabled, and wherein each of the plurality of nodes is multiprotocol label switching (MPLS) enabled;
in response to receiving the instruction, mapping a first segment identifier (ID) to a label distribution protocol (LDP) label relating to the tunnel;
advertising the first segment ID and identities of the plurality of nodes to other nodes in a the network;
wherein a range in which the first segment ID is contained is different from a range in which the LDP label is contained.

15. The apparatus of claim 14 wherein the method further comprises an act of receiving the LDP label from one of the plurality of nodes.

16. The apparatus of claim 14 wherein the method further comprises:
receiving a packet with the first segment ID attached thereto;
swapping the first segment ID with the LDP label;
forwarding the packet with the LDP label attached thereto.

17. The apparatus of claim 14 wherein the instruction comprises identifiers for the plurality of nodes, respectively.

* * * * *